United States Patent [19]

Sudo et al.

[11] Patent Number: 5,331,582
[45] Date of Patent: Jul. 19, 1994

[54] DIGITAL SIGNAL PROCESSOR USING A COEFFICIENT VALUE CORRECTED ACCORDING TO THE SHIFT OF INPUT DATA

[75] Inventors: Shuhei Sudo, Koufu; Makio Yamaki, Tokyo, both of Japan

[73] Assignee: Pioneer Electronic Corporation, Tokyo, Japan

[21] Appl. No.: 990,168

[22] Filed: Dec. 14, 1992

[30] Foreign Application Priority Data

Dec. 16, 1991 [JP] Japan ............................... 3-331861
Dec. 16, 1991 [JP] Japan ............................... 3-331862

[51] Int. Cl.$^5$ ............................................. G06F 1/02
[52] U.S. Cl. .................................................. 364/722
[58] Field of Search ............... 364/722, 735, 736, 857, 364/716, 748.5

[56] References Cited

U.S. PATENT DOCUMENTS

| | | | |
|---|---|---|---|
| 3,631,230 | 12/1971 | Chen ................................... | 364/716 |
| 4,852,038 | 7/1989 | Wagner et al. ................... | 364/748.5 |
| 5,042,001 | 8/1991 | Brightman et al. ................ | 364/736 |
| 5,179,531 | 1/1993 | Yamaki .............................. | 364/736 |

*Primary Examiner*—Long T. Nguyen
*Attorney, Agent, or Firm*—Fish & Richardson

[57] ABSTRACT

A digital signal processor (DSP) computes logarithmic values for data values of the input signal by using an approximation formula expanded into power series. To reduce the number of computing steps, the processor includes a shift circuit for shifting an input data value into a predetermined range of numeric values, a high-order coefficient memory for storing coefficient values of high order coefficients other than a zero-order coefficient of the approximation formula for data values within the predetermined range of numeric values, a zero-order coefficient memory for storing a coefficient value of the zero-order coefficient shifted according to the number of digits shifted by the shift circuit, and an address specifying circuit for specifying a reading address of the zero-order memory corresponding to the number of digit shifted by the shifted circuit. Also, a DSP computes an inverse logarithmic value of a data value of the input signal by using an approximation formula expanded into power series. The processor includes a summing circuit for summing a specific value to an input data value so that a summed value falls within a predetermined range of numeric values, a coefficient memory for storing coefficient values of the approximation formula for data values within the predetermined range of numeric values, and a shift circuit for shifting a result of computation performed by using the approximation formula by a number of digits corresponding to the specific value summed by the summing circuit.

2 Claims, 3 Drawing Sheets

FIG. 2

| ADDRESS | ZERO ORDER COEFFICIENT DATA |
|---|---|
| ---- | ---- |
| n-4 | 1.20412+C00 |
| n-3 | 0.90309+C00 |
| n-2 | 0.60206+C00 |
| n-1 | 0.30103+C00 |
| n   | 0.00000+C00 |
| n+1 | -0.30103+C00 |
| n+2 | -0.60206+C00 |
| n+3 | -0.90309+C00 |
| n+4 | -1.20412+C00 |
| ---- | ---- |

DIGITAL SIGNAL PROCESSOR USING A COEFFICIENT VALUE CORRECTED ACCORDING TO THE SHIFT OF INPUT DATA

BACKGROUND OF THE INVENTION

1. Field of the Invention

The present invention relates to a digital signal processor (hereinafter referred to as "DSP") that computes logarithmic values or inverse logarithmic values for data values of an input signal.

2. Description of Background Information

In recent years, processing of analog signals has become an important task of signal processors, wherein a digital signal obtained by analog-to-digital conversion of an input analog signal is treated by a processor, constituting a circuit such as a wave filter, or a modulator circuit, and so forth. To realize the function of such a circuit by using a DSP, it is necessary to repeat a number of multiplication operations, so it is quite effective to substitute such multiplication operations with summing operations, for facilitating the computing operations. To permit the substitution of arithmetic operations, conversion of input values to logarithmic values, or subsequent inverse conversion of the logarithmic values, are often implemented.

When a logarithmic value Log (x) of an input value x is expanded into power series by the expansion according to the Taylor' theorem, the resultant power series can be expressed by the following equation (1).

$$Log\ (x) = c_0 + c_1 x + c_2 x^2 + c_3 x^3 + \ldots \qquad (1)$$

Therefore, if the coefficients $c_0, c_1, c_2 \ldots$ in the equation (1) are prepared, a logarithmic value can be obtained by sequentially performing operations of: computing the square (second power), the third power, ... of the input signal x; multiplying a corresponding coefficient to the result of computation; and obtaining a sum total of the products.

Since various values ranging from a small value to a large value can be inputted as the value x to be substituted into the equation (1), the number n of coefficients $c_n$ to be prepared should be large enough to reduce the magnitude of errors below a tolerance level for the whole range of the input signal.

Consequently, with conventional processors used for the logarithmic conversion, the coefficients $c_n$ are prepared up to a number which allows the error of the logarithmic value obtained by the conversion to be maintained below the tolerance level for a certain range of input value x, e.g., 0.999 through 0.1 of input value x. When the input value x is outside this range, the input value is shifted to a value within the range so that the computation is performed by using the shifted value, then a correction by a value corresponding to the shift amount is effected to the computed value.

Specifically, when the input value is 0.005, the input value desirably is shifted by two digits, i.e., multiplied by $10^2$, in order that the shifted value falls within the above-mentioned range of 0.999 through 0.1. After the multiplication of 0.005 by $10^2$, the input value has a value 0.5, and the logarithmic conversion is effected to this shifted value 0.5, to yield an output value $-0.30103$. The thus produced converted value is then processed by a shift correction operation.

The correction operation against the shift is performed by adding a logarithmic value of $10^{-2}$, that is, a value $-2.00$ in this case, to the computed result since the input value has been shifted upward by two digits ($10^2$). Thus, the summed value $-2.30103$ is issued as the logarithmic conversion value of the input value x when x = 0.005.

When an inverse logarithmic value $10^x$ of an input value x is expanded into power series by the expansion according to the Taylor' theorem, the resultant power series can be expressed by the following equation (2).

$$10^x = r_0 + r_1 x + r_2 x^2 + r_3 x^3 + \ldots \qquad (2)$$

Therefore, if the coefficients $r_0, r_1, r_2 \ldots$ in the equation (2) are prepared, an inverse logarithmic value can be obtained by sequentially performing operations of: computing the square (second power), the third power, ... of the input signal x; multiplying a corresponding coefficient to the result of computation; and obtaining a sum total of the products.

Since various values ranging from a small value to a large value can be inputted as the value x to be substituted into the equation (2), the number n of coefficients $r_n$ to be prepared should be large enough to reduce the magnitude of errors below a tolerance level for the whole range of the input signal.

Consequently, with processors used for the inverse logarithmic conversion, the coefficients $r_n$ are prepared up to a number which allows the error of the inverse logarithmic value obtained by the conversion to be maintained below the tolerance level for a certain range of input value x, e.g., 0.999 through 0.1 of input value x. When the input value x is outside the predetermined range, a certain number is added to the input value to produce a value within the predetermined range so that the computation is performed by using the summed value, then a correction is effected by dividing the computed value by a value corresponding to the number added to the input value.

Specifically, when the input value is 2.30103, a certain value $-2$ is suitably added to the input value, in order that the summed value falls within the above-mentioned range of 0.999 through 0.1. After the addition of the value $-2$, the summed value is equal to 0.30103, and the inverse logarithmic conversion is effected to the value 0.30103, to yield an output value 2.000. The thus produced converted value is then processed by a correction operation.

The correction operation in this case is performed by dividing the computed value by an inverse logarithmic value of $10^{-2}$, i.e., 0.01, or to multiply $10^2$ to the computed result since the value added to the input signal is $-2$. Thus, the resultant multiplied value 200.000 is issued as the inverse logarithmic conversion value of the input value x when x = 2.30103.

As described previously, with the conventional DSP used to calculate the logarithmic value log x of the input value x, the input value is shifted so that it falls in a predetermined range, the computation operation for producing the logarithmic value is effected to the shifted input value, and a correction value corresponding to the amount shift is added to the result of computation. Consequently, there has been a drawback that a large number of processing steps are required, so that the a longer processing time is needed.

Furthermore, with the conventional DSP used to calculate the inverse logarithmic value $10^x$ of the input value x, a certain number is added to the input value so that the summed value falls in a predetermined range, the computation operation for producing the inverse logarithmic value is effected to the summed value produced from the input value, and a correction value corresponding to the certain value added to the input value is multiplied to the result of computation. Consequently, there has been a drawback that a large number of processing steps are required, so that a longer processing time is needed.

OBJECTS AND SUMMARY OF THE INVENTION

An objective of the present invention is to provide a digital signal processor with the number of operating steps is reduced, to perform the computation operation in a shorter processing time.

The scheme devised by the present invention to attain the above objective will be described hereinafter.

According to a first aspect of the present invention, in a digital signal processor for computing logarithmic values for data values of the input signal by using an approximation formula expanded into power series, the improvement comprises:

a shift circuit for shifting an input data value within a predetermined range of numeric values;

a high-order coefficient memory for storing coefficient values of high order coefficients other than a zero-order coefficient of said approximation formula for data values within said predetermined range of numeric values;

a zero-order coefficient memory for storing a corrected coefficient value of the zero-order coefficient in said approximation formula, corrected according to number of digits shifted by said shift circuit; and an address specifying circuit for specifying a reading address of said zero-order memory corresponding to the number of digit shifted by said said shifted circuit.

With the digital signal processor according to the present invention, the input data value is shifted at the shift circuit so that it falls within the predetermined range of numeric values. The high-order coefficient memory stores coefficient values of high-order order coefficients other than the zero-order coefficient in the power series approximation equation, for data values in the predetermined range of numeric values.

The zero-order coefficient memory, on the other hand, stores a value obtained by adding a correction value corresponding to the number of digits shifted by the shift circuit, to the zero-order coefficient of the power series approximation operation, for data values in the predetermined range of numeric values.

When the computing process is performed, the address specifying circuit specifies an address of the zero-order memory in which a zero-order coefficient corresponding to the number of digits shifted by the shift circuit is stored, and reads-out the specified address.

As described above, in the digital signal processor according to the present invention, the input data value is shifted so that it falls in the predetermined range of numeric values, high-order coefficients other than zero-order coefficient are read-out from the high-order coefficient memory and used for the multiplication, the zero-order coefficient is read-out from the zero-order coefficient memory in which a correction value obtained by a correction corresponding to the shift amount is stored, and the logarithm of the input value is obtained as a sum total of the products and the read-out zero-order coefficient. Thus, the correction by shift is not required in the digital signal processor according to the present invention, so that the number of steps of computing processes is reduced, and the processing time also is shortened.

According to a second aspect of the present invention, in a digital signal processor for computing an inverse logarithmic value of a data value of the input signal by using an approximation formula expanded into power series, the improvement comprises:

a summing circuit for summing, to an input data value, a specific value which renders a summation value falls within a predetermined range of numeric values;

a coefficient memory for storing coefficient values of said approximation formula for data values within said predetermined range of numeric values; and a shift circuit for shifting a result of computation performed by using said approximation formula by a number of digits corresponding to said specific value summed by said summing circuit.

With the digital signal processor according to the present invention, a specific value is added to the input data value at the summing circuit so that the summed value falls within the predetermined range of numeric values.

The coefficient memory stores coefficient values of the power series approximation equation, for data values within the predetermined range of numeric values.

The shift circuit shifts a resultant value obtained by the execution of computing process, by a number of digits corresponding to the summing value added to the input data at the summing circuit.

As described above, in the digital signal processor according to the second aspect of present invention, a specific value is added to the input data value so that the summed value falls in the predetermined range of numeric values, the inverse logarithm is computed for the input value within the predetermined range of numeric values, and the resultant value is shifted at the shift circuit, by a number of digits corresponding to the specific value added to the input value. Thus, the computation operation is completed at the same time as the completion of inverse logarithm conversion process. It follows that the correction by shift is not required in the digital signal processor according to the present invention, so that the number of steps of computing processes is reduced, and the processing time also is shortened.

BRIEF DESCRIPTION OF THE DRAWINGS

FIG. 2 is a diagram showing an example of zero-order coefficient memory provided in the embodiment shown in FIG. 1.

DETAILED DESCRIPTION OF THE PREFERRED EMBODIMENTS

Figure 1:
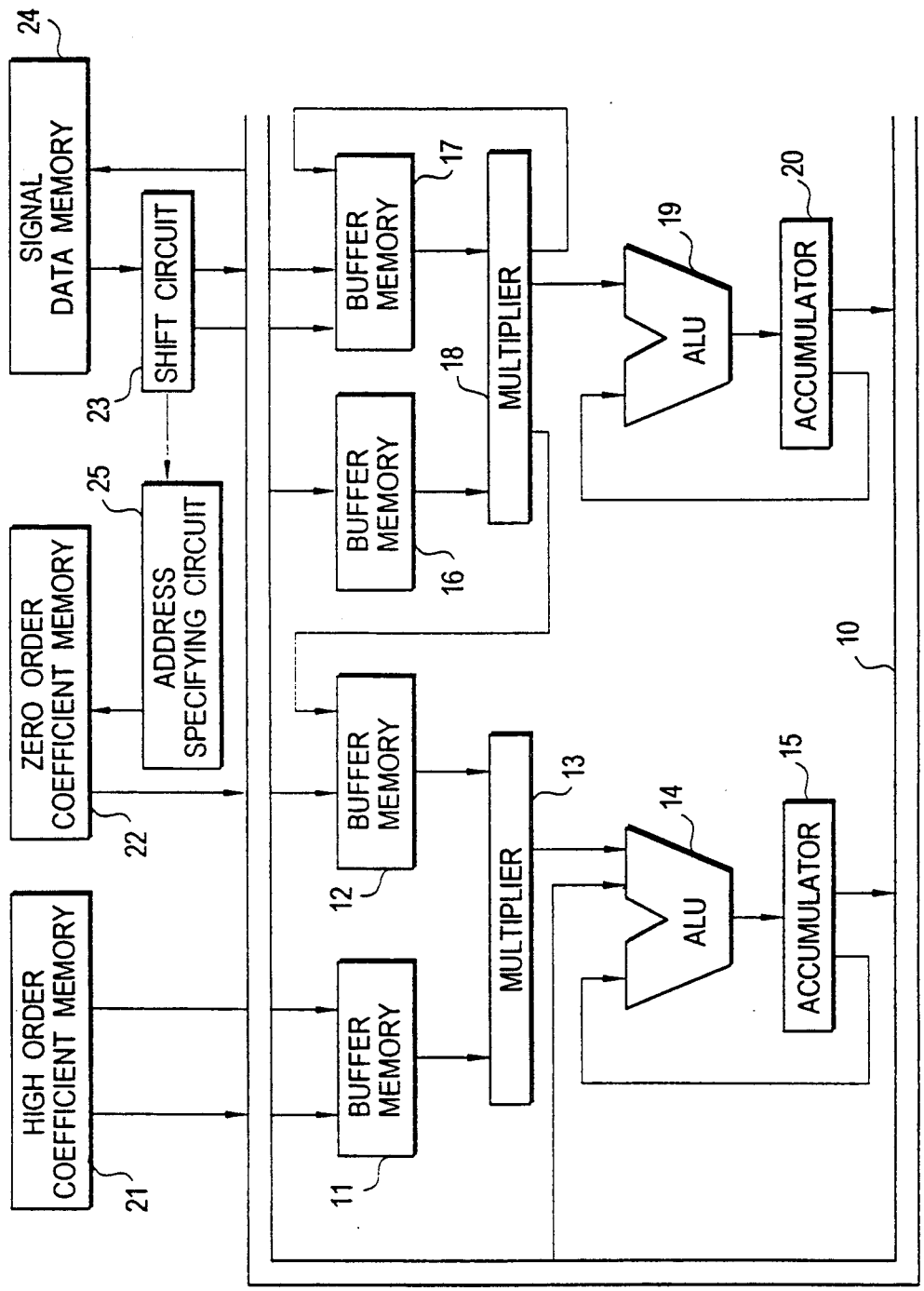
FIG. 1 is a schematic diagram showing the construction of a first embodiment of the present invention.

The first embodiment of the DSP according to the present invention will be described with reference to FIGS. 1 and 2 of accompanying drawings. The DSP is constituted by various parts including a data bus 10, buffer memories 11, 12, 16, and 17, multipliers 13 and 18, arithmetic unit (ALU) 14 and 19, accumulators 15 and 20, and a signal data memory 24 for storing input data to be converted to logarithmic values. The ALU 14 has one input terminal and other input terminals consisting of first and second terminals.

The reference numeral 21 denotes a high-order coefficient memory for storing high-order coefficients other than the zero-order coefficient for data values within a particular range of numeric values. Similarly, there are provided a zero-order coefficient memory 22 for storing coefficient values generated by correcting zero-order coefficients for the data values within the particular range of numeric values according to the amount of shift of the input data, a shift circuit 23 for shifting the input data so that it falls within the predetermined range of numeric values, a signal data memory 24 for storing signal data, and an addressing circuit for generating an addresses for reading out the zero-order coefficient corresponding to the number of digits shifted by the shift circuit 23.

FIG. 2 exemplary shows the detail of the zero-order coefficient memory 22, wherein data $c_{00}$ is a zero-order coefficient for data values within the particular range of numeric value. When the input data is shifted upward by one digit at the shift circuit 23, it means that the input data is multiplied by $2^1$, since data values are expressed at binary notation. Consequently, the computed value must be corrected by the multiplication of a value $2^{-1}$. Since the value of Log $2^{-1}$ is equal to $-0.30103$, a coefficient value generated by adding the value $-0.30103$ to $c_{00}$ is stored in a memory location having an address $n+1$ corresponding to one digit upward shift of the input data.

Similarly, when the input data is shifted upward by two digits, a coefficient value generated by adding a value $-0.60206$ to $c_{00}$ is stored in a memory location having an address $n+2$, and a coefficient value generated by adding a value $0.60206$ to $c_{00}$ is stored in a memory location having an address $n-2$ when the input data is shifted downward by two digits. In the similar manner, coefficient values corrected according to the number of shifted digits are stored in other memory locations in the zero-order coefficient memory 22.

The address specifying circuit 24 transmits a signal specifying an address of the zero-order coefficient memory 22 in which a zero-order coefficient corresponding to the number of digits shifted by the shift circuit 23 is stored.

Now, the operation of the DSP having the above-described construction will be described hereinafter. The operations described hereinafter are performed in response to control signals produced by a sequence controller which is not shown in the figure.

Assume that the coefficient data in the zero-order coefficient data memory 22 and the high-order coefficient memory 21 are stored prior to the start of the logarithmic conversion operation.

When the computing operation is started, a signal data x is read-out from the signal data memory 24 and supplied to buffer memories 12, 16, and 17 at the first step. To the buffer memory 11, a coefficient data $c_1$ read-out from the high-order coefficient memory 21 is supplied. The signal data x and the coefficient data $c_1$ are then multiplied at the multiplier 13, and a result of multiplication $c_1 x$ by the multiplier 13 is supplied through the ALU 14 to the accumulator 15 and held therein at the second step which is one step after the first step. On the other hand, the multiplier 18 multiplies the signal data x by itself, to produce the square of data x. The resultant value $x^2$ obtained by the multiplication at the multiplier 18 is supplied to buffer memories 12 and 17 at the second step.

At the second step, a coefficient data $c_2$ is read-out from the high-order coefficient memory 21 and supplied to the buffer memory 11. The coefficient data $c_2$ is multiplied to the value $x^2$ at the multiplier 13. The resultant value $c_2 x^2$ of the multiplication at the multiplier 13 is supplied to a first one of the other input terminals of the ALU 14. In synchronism with the supply of the value $c_2 x^2$, the data value $c_1$ held in the accumulator 15 is supplied to the one input terminal of the ALU 14. At the third step, the ALU 14 performs the accumulation of the values $c_1 x$ and the value $c_2 x^2$, and the resultant accumulated value $c_1 x + c_2 x^2$ is held at the accumulator 15. The multiplier 18, on the other hand, multiplies the signal data x held in the buffer memory 16 and the signal data $x^2$ held in the buffer memory 17. The resultant value $x^3$ of multiplication by the multiplier 18 is supplied to the buffer memories 12 and 17 at the third step.

At the third step, a coefficient data $c_3$ is read-out from the high-order coefficient memory 21 and supplied to the buffer memory 11. The coefficient data $c_3$ is multiplied to the value $x^3$ at the multiplier 13. The resultant value $c_3 x^3$ of the multiplication at the multiplier 13 is supplied to a first one of the other input terminals of the ALU 14. In synchronism with the supply of the value $c_3 x^3$, the data value $c_1 + c_2 x^2$ held in the accumulator 15 is supplied to the one input terminal of the ALU 14. At the fourth step, the ALU 14 performs the accumulation of the values $c_1 x + c_2 x^2$ and $c_3 x^3$, and the resultant accumulated value $c_1 x + c_2 x^2 + c_3 x^3$ is held at the accumulator 15. The multiplier 18, on the other hand, multiplies the signal data x held in the buffer memory 16 and the signal data $x^3$ held in the buffer memory 17. The resultant value $x^4$ of multiplication by the multiplier 18 is supplied to the buffer memories 12 and 17 at the fourth step.

By repeating the above-described operations n-times, a total sum from the first order product to the n-th order product will be computed. The sum total is held in the accumulator 15 and at a later stage the coefficient data $c_0$ is read out from the zero-order coefficient memory 22 and supplied to the second one of the other input terminals of the ALU 14. In synchronism with the transmission of the coefficient data $c_0$, the accumulation value of the first to n-th order products held in the accumulator 15 is supplied to the one input terminal of the ALU 14. Thus, the accumulation between the zero-order data value and the accumulated data value from the first to n-th order is performed by the ALU 14, and the resultant value, that is, the logarithmic converted value is held by the accumulator 15.

Although the above embodiment has been described by way of an example in which a conversion of input data to a common logarithm is performed, the application of the present invention is not limited to this example. Since logarithmic functions $LOG_a x$ other than the common logarithm can be converted to $LOGx/LOGa$, computation operations for such logarithmic functions can be performed by storing an association of values generated by dividing each coefficient value by $LOGa$.

As specifically described in the foregoing, the following effects are attained in the above-described embodiment according to the present invention. Particularly, the input data value is shifted so that it falls within a predetermined range of numeric values, high-order coefficients other than the zero-order coefficient are read-out from the high-order coefficient memory and the multiplication is performed by using each of the read-out high-order coefficients, and the zero-order coefficient is read-out from the zero-order coefficient memory in which values corrected according to the amount of shift are stored, so that a sum total is produced among the products and the zero-order coefficient. With this structure, the correction by shift has become unnecessary, so that the reduction in number of processing steps as well as the reduction of processing time is attained.

A second embodiment of the DSP according to the present invention will be described with reference to FIG. 3 of accompanying drawings.

Figure 3:
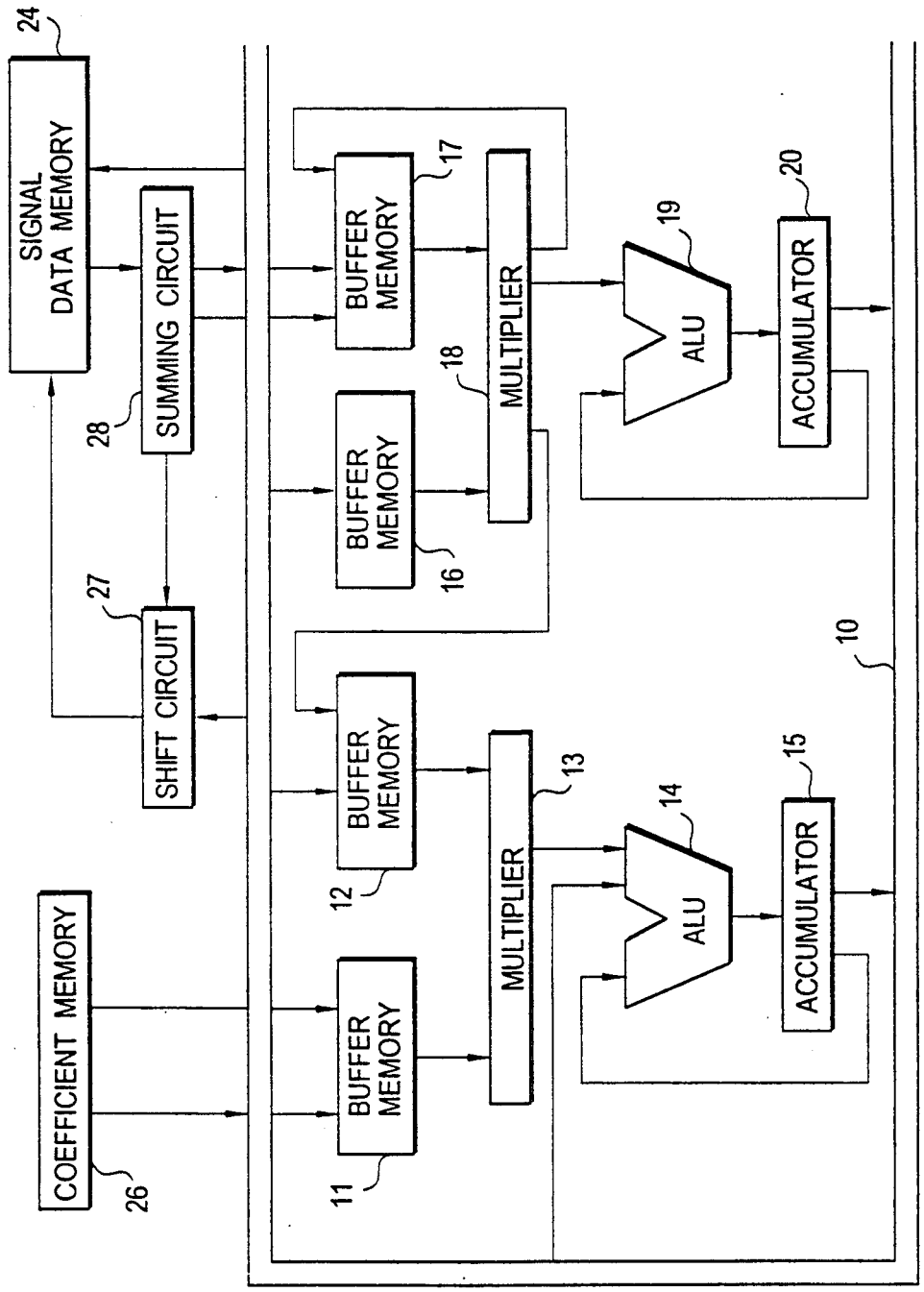
FIG. 3 is a schematic diagram showing the construction of a second embodiment of the present invention.

FIG. 3 is a block diagram of this embodiment which differs from the construction shown in FIG. 1 in that the signal data memory 24 stores input data for inverse logarithmic conversion, and at points relating the coefficient memory 26, summing circuit 27 and shift circuit 28.

Specifically, the coefficient memory 26 stores coefficients for data values within the predetermined range of numeric values, the summing circuit 27 adds a specific value to the input value, so that the summed value falls within the predetermined range of numeric values, and the shift circuit 28 shifts the result of computation effected to the summed value generated by the summing circuit.

The operation of the embodiment of DSP having the above-described construction will be described hereinafter. The operations described hereinafter are performed in response to control signals produced by a sequence controller which is not shown in the figure.

Assume that the coefficient data are stored in the coefficient data memory 26 prior to the start of the logarithmic conversion operation. When data is read-out from the signal data memory 24 and supplied to the buffer memories, summation of a specific number is performed so that the summed value falls within the predetermined range of numeric values.

When the computing operation is started, a signal data x is read-out from the signal data memory 24 and supplied to buffer memories 12, 16, and 17 at the first step. To the buffer memory 11, a coefficient data $r_1$ read-out from the coefficient memory 26 is supplied. The signal data x and the coefficient data $r_1$ are then multiplied at the multiplier 13, and a result of multiplication $r_1 x$ by the multiplier 13 is supplied through the ALU 14 to the accumulator 15 and held therein at the second step which is one step after the first step. On the other hand, the multiplier 18 multiplies the signal data x by itself, to produce the square of data x. The resultant value $x^2$ obtained by the multiplication at the multiplier 18 is supplied to buffer memories 12 and 17 at the second step.

At the second step, a coefficient data $r_2$ is read-out from the coefficient memory 26 and supplied to the buffer memory 11. The coefficient data $r_2$ is multiplied to the value $x^2$ at the multiplier 13. The resultant value $r_2 x^2$ of the multiplication at the multiplier 13 is supplied to a first one of the other input terminals of the ALU 14. In synchronism with the supply of the value $r_2 x^2$, the data value $r_1$ held in the accumulator 15 is supplied to the one input terminal of the ALU 14. At the third step, the ALU 14 performs the accumulation of the values $r_1 x$ and the value $r_2 x^2$, and the resultant accumulated value $r_1 x + r_2 x^2$ is held at the accumulator 15. The multiplier 18, on the other hand, multiplies the signal data x held in the buffer memory 16 and the signal data $x^2$ held in the buffer memory 17. The resultant value $x^3$ of multiplication by the multiplier 18 is supplied to the buffer memories 12 and 17 at the third step.

At the third step, a coefficient data $r_3$ is read-out from the high-order coefficient memory 21 and supplied to the buffer memory 11. The coefficient data $r_3$ is multiplied to the value $x^3$ at the multiplier 13. The resultant value $r_3 x^3$ of the multiplication at the multiplier 13 is supplied to a first one of the other input terminals of the ALU 14. In synchronism with the supply of the value $r_3 x^3$, the data value $r_1 + r_2 x^2$ held in the accumulator 15 is supplied to the one input terminal of the ALU 14. At the fourth step, the ALU 14 performs the accumulation of the values $r_1 x + r_2 x^2$ and $r_3 x^3$, and the resultant accumulated value $r_1 x + r_2 x^2 + r_3 x^3$ is held at the accumulator 15. The multiplier 18, on the other hand, multiplies the signal data x held in the buffer memory 16 and the signal data $x^3$ held in the buffer memory 17. The resultant value $x^4$ of multiplication by the multiplier 18 is supplied to the buffer memories 12 and 17 at the fourth step.

By repeating the above-described operations n-times, a total sum from the first order product to the n-th order product will be computed. The sum total is held in the accumulator 15 and at a later stage the coefficient data $r_0$ is read out from the coefficient memory 26 and supplied to the second one of the other input terminals of the ALU 14. In synchronism with the transmission of the coefficient data $r_0$, the accumulation value of the first to n-th order products held in the accumulator 15 is supplied to the one input terminal of the ALU 14. Thus, the accumulation between the zero-order data value and the accumulated data value from the first to n-th order is performed by the ALU 14, and the resultant value, that is, the inverse logarithmic converted value is held by the accumulator 15.

While the thus obtained inverse logarithmic conversion value is transmitted to the buffer register, it is shifted by the shift circuit 28 according to the numeral summed to the input data at the summing circuit 27.

As described in the foregoing, according to the second feature of the present invention a specific value is added to the input data so that the summed value falls within a predetermined range of numeric values, and processing for the inverse logarithmic conversion is performed to the input value within the predetermined range of numeric values. The resultant data is shifted at the shift circuit, by a number of digits corresponding to the specific value summed to the input value. With this structure, the computing procedure is completed immediately when the inverse logarithmic conversion process is completed, so that the correction associated with the shift has become unnecessary. As specifically described above, reduction in number of processing steps as well as the reduction of processing time is attained according to the present invention.

What is claimed is:

1. A digital signal processor for computing logarithmic values of data values of an input signal by using an approximation formula expanded into power series, comprising:

a shift circuit for shifting an input data value so that a shifted value falls within a predetermined range of numeric values;

a high-order coefficient memory for storing coefficient values of high order coefficients other than a zero-order coefficient of said approximation formula for data values within said predetermined range of numeric values;

a zero-order coefficient memory for storing a corrected coefficient value of said zero-order coefficient in said approximation formula, corrected according to the number of digits shifted by said circuit;

an address specifying circuit for specifying a reading address of said zero-order memory corresponding to the number of digits shifted by said shifted circuit;

a first multiplier operatively connected to said shift circuit, for cyclically raising an input data value shifted by said shift circuit, to obtain powers of said input data value;

a second multiplier operatively connected to said first multiplier and said high-order coefficient memory, for multiplying said powers of input data value respectively by corresponding ones of high order coefficients from said high-order coefficient memory; and an accumulator means operatively connected to said second multiplier and said zero-order coefficient memory, for accumulating said powers respectively multiplied by corresponding ones of said high-order coefficients by means of said second multiplier, to obtain a high-order accumulation value for orders higher than a first order, and accumulating said corrected coefficient value of zero-order coefficient read-out from said reading address of said zero-order coefficient memory specified by said address specifying circuit on said high-order accumulation value, to obtain a logarithmic value of said input data value by said approximation formula.

2. A digital signal processor for computing inverse logarithmic values of data values of an input signal by using an approximation formula expanded into power series, comprising:

a summing circuit for summing, to an input data value, a specific value which renders a summed value falling within a predetermined range of numeric values;

a coefficient memory for storing coefficient values of said approximation formula for data values within said predetermined range of numeric values;

a first multiplier operatively connected to said summing circuit, for cyclically raising said summed value of said input data value from said summing circuit, to obtain powers of said summed value;

a second multiplier operatively connected to said first multiplier and said coefficient memory, for multiplying said powers of said summed value respectively by corresponding ones of coefficients from said coefficient memory;

an accumulator means operatively connected to said second multiplier and said coefficient memory, for accumulating said power respectively multiplied by corresponding ones of said coefficients by means of said second multiplier, to obtain a high-order accumulation value for orders higher than a first order, and accumulating a zero-order coefficient read-out from said coefficient memory on said high-order accumulation value, to obtain an inverse logarithmic value of said summed value by said approximation formula; and a shift circuit operatively connected to said accumulator means, for shifting a result of computation performed by using said approximation formula, which is output from said accumulator means, by a number of digits corresponding to said specific value summed by said summing circuit.

* * * * *